(12) United States Patent
Zettner (10) Patent No.: US 10,668,536 B2
(45) Date of Patent: Jun. 2, 2020

(54) ADDITIVE MANUFACTURING (71) Applicant: SIEMENS AKTIENGESELLSCHAFT, Müchen (DE)

(72) Inventor: Jürgen Zettner, Veitsbronn (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 219 days.

(21) Appl. No.: 15/897,378

(22) Filed: Feb. 15, 2018

(65) Prior Publication Data
US 2018/0229304 A1 Aug. 16, 2018

(30) Foreign Application Priority Data
Feb. 16, 2017 (EP) .................................... 17156500

(51) Int. Cl.
B22F 3/105 (2006.01)
B22F 3/10 (2006.01)
(Continued)

(52) U.S. Cl.
CPC .......... *B22F 3/1055* (2013.01); *B22F 3/1017* (2013.01); *B29C 64/153* (2017.08);
(Continued)

(58) Field of Classification Search
CPC ......... B33Y 30/00; B33Y 50/02; B33Y 10/00; B29C 64/153; B29C 64/205;
(Continued)

(56) References Cited

U.S. PATENT DOCUMENTS 6,155,073 A * 12/2000 Gray ..................... F25B 17/083
62/480
8,358,094 B2 1/2013 Zettner
(Continued)

FOREIGN PATENT DOCUMENTS

DE 10236697 A1 2/2004
DE 102016110789 A1 1/2017
(Continued)

OTHER PUBLICATIONS

Anonymous: "Heat equation", Wikipedia, XP055395552, gefunden im Internet: URL:https://en.wikipedia.org/w/index.php?title=Heat_equation&oldid=764517386, getfunden-am Aug. 2, 2017; 2017.
(Continued)

*Primary Examiner* — Thomas C Lee
*Assistant Examiner* — Michael Tang
(74) *Attorney, Agent, or Firm* — Henry M. Feiereisen LLC (57) ABSTRACT First subareas of a layer of powder applied on a substrate are heated locally with a process beam so as to heated, but not yet interconnect the grains of the powder in the first subareas. A temperature profile of the applied layer is evaluated proximate to the first subarea as a function of the distance from the respective first subarea and/or the time. The local thermal conductivity and/or local diffusivity are determined for the respective first subarea based on the temperature profile. Second subareas of the applied layer which at least partially overlap the first subareas are then heated locally with the process beam so as to interconnect the grains of the powder in the second subareas. A process variable of the process beam influencing heating of the second subareas is determined based on the local thermal conductivity or diffusivity previously determined for the at least partially overlapping first subarea.

17 Claims, 7 Drawing Sheets (51) Int. Cl.
*B33Y 10/00* (2015.01)
*B33Y 50/02* (2015.01)
*B33Y 30/00* (2015.01)
*B29C 64/153* (2017.01)
*B29C 64/205* (2017.01)

(52) U.S. Cl.
CPC ............ B29C 64/205 (2017.08); B33Y 10/00 (2014.12); B33Y 30/00 (2014.12); B33Y 50/02 (2014.12); *B22F 2003/1057* (2013.01); *B22F 2203/03* (2013.01); *B22F 2203/11* (2013.01); *B22F 2999/00* (2013.01); *Y02P 10/295* (2015.11)

(58) Field of Classification Search
CPC ............ B22F 3/1017; B22F 2003/1057; B22F 2203/03; B22F 2203/11; B22F 2999/00; B22F 3/1055; Y02P 10/295
See application file for complete search history.

(56) References Cited

U.S. PATENT DOCUMENTS

| | | | |
|---|---|---|---|
| 9,696,381 B2 | 7/2017 | Zettner et al. | |
| 2004/0104499 A1 | 6/2004 | Keller | |
| 2005/0002435 A1* | 1/2005 | Hashimoto | G01N 25/18 374/43 |
| 2013/0264472 A1 | 10/2013 | Schimmer et al. | |
| 2013/0300035 A1 | 11/2013 | Snis | |
| 2014/0263209 A1 | 9/2014 | Burris et al. | |
| 2014/0265046 A1* | 9/2014 | Burris | B23K 26/034 264/497 |
| 2014/0301424 A1* | 10/2014 | Adamczyk | G01N 25/18 374/44 |
| 2015/0174658 A1* | 6/2015 | Ljungblad | B29C 64/20 419/55 |
| 2016/0303687 A1 | 10/2016 | Ljungblad | |
| 2016/0321384 A1* | 11/2016 | Pal | G06F 17/5018 |
| 2017/0282455 A1 | 10/2017 | DeFelice et al. | |
| 2017/0334144 A1* | 11/2017 | Fish | B33Y 50/02 |
| 2018/0339360 A1* | 11/2018 | Goto | B23K 15/0086 |

FOREIGN PATENT DOCUMENTS

| | | |
|---|---|---|
| EP | 3235640 A1 | 5/2018 |
| EP | 3318352 A1 | 5/2018 |
| JP | H10211658 A | 8/1998 |
| JP | 2012533682 A | 12/2012 |
| JP | 2014508668 A | 4/2014 |
| WO | WO 2016119898 A1 | 8/2016 |
| WO | WO 2016169785 A1 | 10/2016 |

OTHER PUBLICATIONS

Devesse Wim et al: "Hardware-in-the-loop control of additive manufacturing processes using temperature feedback", Journal of Laser Applications, American Institute of Physics, 2 Huntington Quadrangle, Melville, NY 11747, May 2016, vol. 28, No. 2, XP012206453; DOI: 10.2351/1.4943911, sections II and V—Datum im Recherchenbericht falsch; Artikel wurde im May 2016 veröffentlicht; 2016.

* cited by examiner

ADDITIVE MANUFACTURING

CROSS-REFERENCES TO RELATED APPLICATIONS

This application claims the priority of European Patent Application, Serial No. 17156500.5, filed Feb. 16, 2017, pursuant to 35 U.S.C. 119(a)-(d), the content of which is incorporated herein by reference in its entirety as if fully set forth herein.

BACKGROUND OF THE INVENTION

The present invention relates to an operating method for an additive manufacturing device. The present invention also relates to a control device for an additive manufacturing device, a computer program for the control device, and an additive manufacturing device.

The following discussion of related art is provided to assist the reader in understanding the advantages of the invention, and is not to be construed as an admission that this related art is prior art to this invention.

The layer-by-layer manufacturing of often complex three-dimensional structures is carried out by means of additive manufacturing. A typical example is so-called SLM=selective laser melting. Further examples are laser sintering, electron beam melting and electron beam sintering. The quality of the manufactured structures, for example their dimensional accuracy, the quality of the connection of the individual layers with one another, cavities and inclusions, is dependent on many parameters.

It would be desirable and advantageous to obviate prior art shortcomings and to provide an improved method for additive manufacturing.

SUMMARY OF THE INVENTION

According to one aspect of the invention, an operating method includes the following steps: prior to the actual heating process (hereinafter referred to as the second heating process), in a first heating process, first subareas of the applied layer are heated locally by means of the process beam such that the grains of the powder in the respective first subarea are heated but are not yet connected to one another. The first subareas are determined such that the subareas which are heated in the second heating process (hereinafter referred to as the second subareas) at least partially overlap the first subareas. A temperature profile of the applied layer is detected by means of a detection device. The temperature profile is evaluated in the vicinity of the respective first subarea as a function of the distance from the respective first subarea. Alternatively, or in addition, an evaluation can take place as a function of time. As part of the evaluation, at least the local thermal conductivity or the local diffusivity is determined based on the temperature profile for the respective first subarea. Determination advantageously takes place quantitatively. However, at least one qualitative determination takes place, i.e. it is determined whether the local thermal conductivity and/or the local diffusivity in certain areas is greater or smaller than in other areas. At least one process variable of the process beam influencing the heating of the second subarea is determined as a function of the previously determined local thermal conductivity or diffusivity for the at least overlapping first subarea.

In this way, it is possible for the actual heating of the second subareas to correlate better with a desired heating than in the prior art. The improved heating results in an improved and more precise connection of the second subareas heated in the second heating process with the substrate.

Usually sintering or melting of the applied powder takes place during the second heating process in the second subareas. Furthermore, the process beam is usually a laser or electron beam. However, other connecting operations and/or other process beams are also conceivable.

It is possible that at least one of the first subareas is designed as a linear structure. In this case, insofar as a spatial evaluation takes place, the temperature profile is advantageously evaluated orthogonally to the linear structure in one dimension. It is likewise possible that at least one of the first subareas is designed as a point structure. In this case, insofar as a spatial evaluation takes place, the temperature profile can be evaluated orthogonally to the point structure in one dimension or in two dimensions. The measures can also be combined with one another insofar as one of a plurality of first subareas can be designed as a linear structure and another as a point structure. For example, for a plurality of point structures, a spatial evaluation in one dimension or a spatial evaluation in two dimensions may be performed.

The first subareas can advantageously be matched to the second subareas in an appropriate manner. In particular, if a second subarea is designed as an elongated structure or has a border edge, the respective first subarea can be designed as a linear structure. The first subarea in this case should be either parallel or orthogonal to the second subarea or parallel or orthogonal to the border edge. If a second subarea has a corner or an overhang, the respective first subarea advantageously comprises the corner or the overhang.

The local thickness of the applied layer can advantageously be determined prior to the first heating process. The term "local thickness" means here that the thickness is determined in a spatially resolved manner over the surface of the layer. Corresponding methods are known to a person skilled in the art. In this case, as part of the determination of at least one of the process variables of the process beam influencing the heating of the first subareas, the local thickness can be considered as part of the determination of the local thermal conductivity or local diffusivity and/or as part of the determination of the at least one process variable of the process beam influencing the heating of the second subareas in addition to the local thermal conductivity or local diffusivity.

Alternatively, it is possible that the local thickness of the applied layer is determined after the first heating process. In this case, the local thickness can be considered as part of the determination of the local thermal conductivity or local diffusivity and/or as part of the determination of the at least one process variable of the process beam influencing the heating of the second subareas in addition to the local thermal conductivity or local diffusivity.

Under some circumstances, it is even possible that after the determination of the local thickness, but prior to the next heating process, a compensation process is performed with the aim of compensating for fluctuations in the local thickness. For example, a baseplate forming the initial substrate in the manufacture of the component to be produced can be shaken. Alternatively, or in addition, for example, a doctor blade device by means of which the applied powder is distributed can be controlled.

It is furthermore possible that the local thermal capacity is also determined as well as that the local thermal capacity is considered as part of the determination of the at least one process variable of the process beam influencing the heating of the second subareas.

At least one of the following variables, for example, can be used as a process variable of the process beam:
- the output power of the process beam,
- the feed rate at which the process beam is moved over the layer,
- a modulation of the output power of the process beam,
- a focus variable of the process beam.

Advantageously, the temperature profile can be spectrally filtered by the detection device before detection such that the process beam itself is blocked in the temperature profile. In this way, the signal-to-noise ratio can be optimized.

It is possible that thermal imaging detectors are used as detection devices. However, other detection devices—for example CCD cameras—can also be used.

According to another aspect of the present invention, an additive manufacturing device includes an application device configured to apply a layer of a powder onto a substrate, a process beam generator generating a process beam which locally heats a subarea of the applied layer, a detection device measuring a temperature profile of the applied layer, and a control device. The control device is configured to.
a) in a first heating process, cause the process beam to locally heat first subareas of the applied layer so as to heat, but not yet interconnect with one another, grains of the powder in a respective first subarea;
b) evaluate the measured temperature profile in a vicinity of a respective first subarea as a function of a distance from the respective first subarea or as a function of time, or both;
c) quantitatively or qualitatively determine, as part of the evaluation, at least a local thermal conductivity or a local diffusivity for the respective first subarea based on the temperature profile;
d) in a second heating process, cause the process beam to locally heat second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the local diffusivity previously determined for the respective overlapping first subarea, and
e) iteratively perform the steps a) through d) until a complete structure has been produced on the substrate.

According to yet another aspect of the present invention, a computer program is provided which is embodied on a non-transitory storage medium and includes machine code, which when loaded into a memory of a control device of an additive manufacturing device and executed by the control device, cause the control device to operate the additive manufacturing device by:
a) with an application device, applying a layer of a powder onto a substrate;
b) in a first heating process, locally heating with a process beam first subareas of the applied layer so as to heat, but not yet interconnect with one another, grains of the powder in a respective first subarea;
c) measuring with a detection device a temperature profile of the applied layer;
d) evaluating the temperature profile in a vicinity of a respective first subarea as a function of a distance from the respective first subarea or as a function of time, or both;
e) quantitatively or qualitatively determining, as part of the evaluation, at least a local thermal conductivity or a local diffusivity for the respective first subarea based on the temperature profile;
f) in a second heating process, locally heating with the process beam second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the local diffusivity previously determined for the respective overlapping first subarea, and
g) iteratively performing the steps a) through f) until a complete structure has been produced on the substrate.

According to still another aspect of the present invention, a control device for an additive manufacturing device is provided for the aforedescribed additive manufacturing device. The control device is configured to cause:
a) in a first heating process, the process beam to locally heat first subareas of the applied layer so as to heat, but not yet interconnect with one another, grains of the powder in a respective first subarea;
b) evaluate the measured temperature profile in a vicinity of a respective first subarea as a function of a distance from the respective first subarea or as a function of time, or both;
c) quantitatively or qualitatively determine, as part of the evaluation, at least a local thermal conductivity or a local diffusivity for the respective first subarea based on the temperature profile;
d) in a second heating process, the process beam to locally heat second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the local diffusivity previously determined for the respective overlapping first subarea, and
e) iteratively perform the steps a) through d) until a complete structure has been produced on the substrate.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
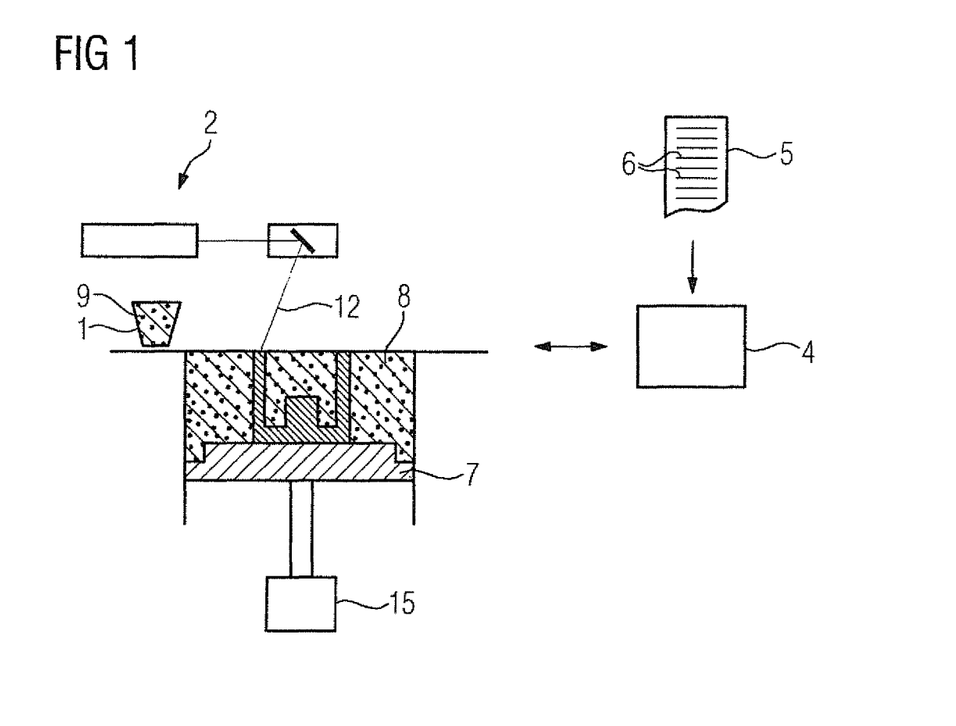
FIG. 1 shows parts of an additive manufacturing device.
Figure 2:
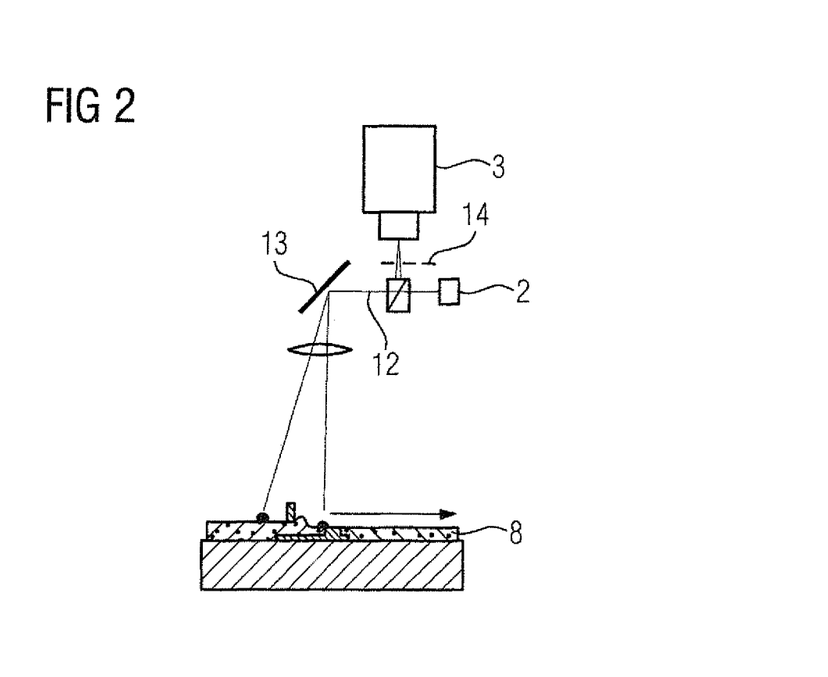
FIG. 2 shows parts of the additive manufacturing device from FIG. 1.

Turning now to the drawing, and in particular to FIGS. 1 and 2, wherein each figure shows parts of an additive manufacturing device. Some parts of the additive manufacturing device are only shown here in FIG. 1, but not in FIG. 2. In the case of other parts, the reverse applies. Regardless of whether certain parts of the additive manufacturing device are only shown in FIG. 1, only in FIG. 2 or both in FIG. 1 and in FIG. 2, they are components of the additive manufacturing device, however.

According to FIGS. 1 and 2, an additive manufacturing device has an application device 1, a process beam generator 2, a detection device 3 and a control device 4. The control device 4 is programmed with a computer program 5. The computer program 5 comprises machine code 6 which can be executed immediately by the control device 4. The execution of the machine code 6 by the control device 4 has the effect of the control device 4 operating the additive manufacturing device according to an operating method which is explained in more detail hereinafter in connection with FIG. 3 (and the other figures).

Figure 3:
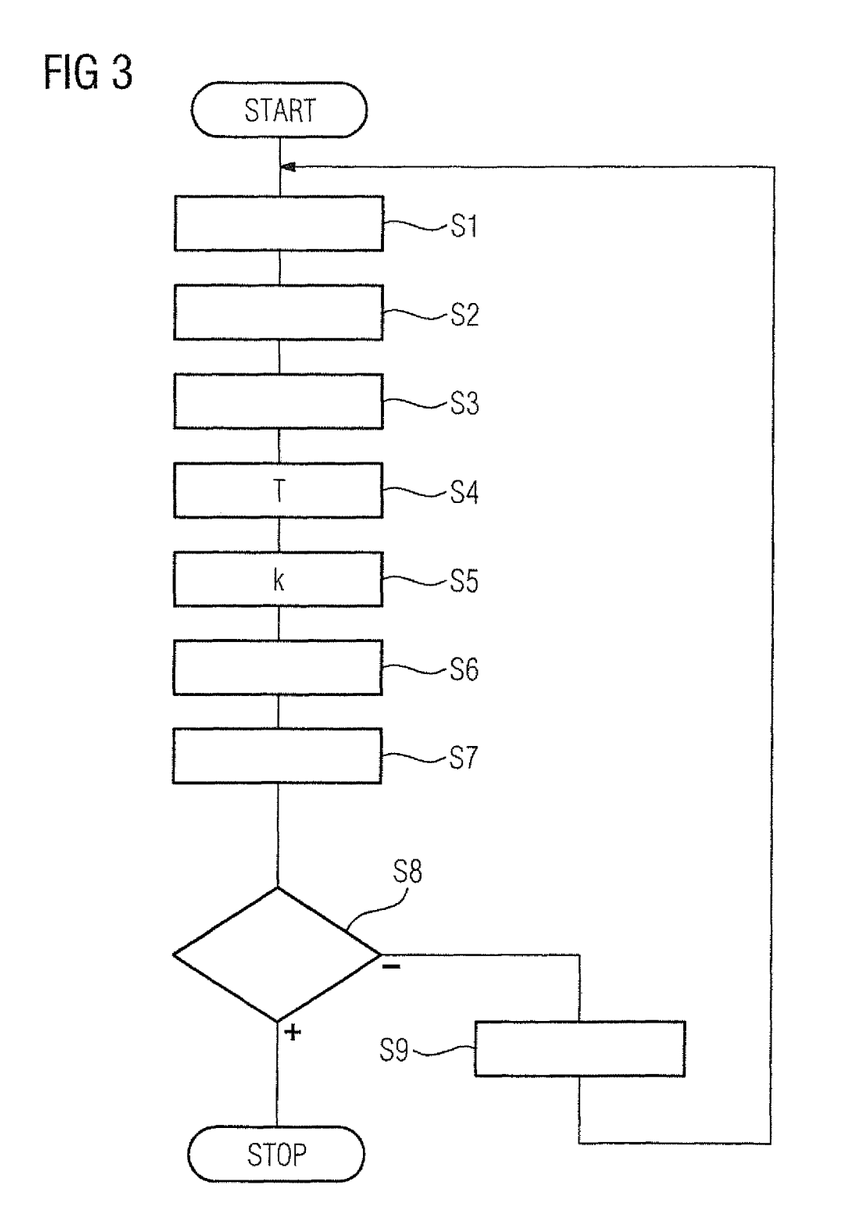
FIG. 3 is a process flow chart.
Figure 4:
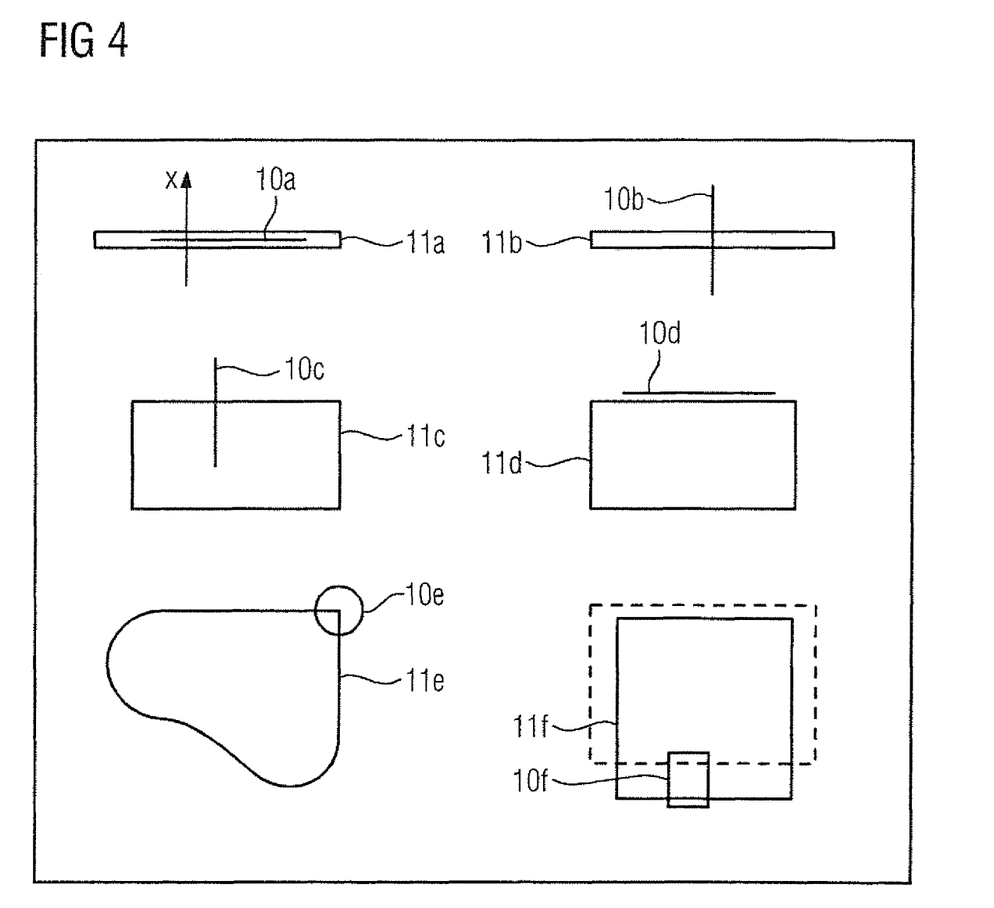
FIG. 4 shows a top view of a layer of powder.

According to FIG. 3, the control device 4 controls the application device 1 in a step S1 such that the application device 1 applies a layer 8 of a powder 9 to a substrate. With the application of the first layer 8, the substrate is identical to a baseplate 7 of the additive manufacturing device. With the application of the subsequent layers 8, the substrate is identical to the layer 8 applied immediately before in each case. Purely by way of example, FIG. 1 shows the state from the side after the application of the powder 9, the layers 8 having already been applied previously. FIG. 4 shows this state from above.

In a step S2, the control device 4 determines first subareas 10 of the layer 8. In particular, the control device 4 for each second subarea 11 of the layer 8 determines at least one associated first subarea 10. The second subareas 11 of the layer 8 are those areas of the layer 8 which are later to be connected to the substrate. The determination is undertaken by the control device 4 in such a manner that the first subareas 10 and second subareas 11 overlap at least partially. For the subsequent explanation of the criteria for the determination of the associated first subareas 11, hereinafter the first and second subareas 10, 11 are each supplemented by a lower-case letter (a to f).

if, for example, a second subarea 11a exists which is designed as an elongated structure, the associated first subarea 10a can be designed as a linear structure 10a parallel to the second subarea 11a. Alternatively, it is possible that if a second subarea 11b is designed as an elongated structure, the respective first subarea 10b is designed as a linear structure orthogonal to the second subarea 10b. An elongated structure of a second subarea 11a, 11b exists not only when the same is straight. It can also be curved. However, the linear structure of the associated first subarea 10a, 10b is usually straight.

the analogous approaches are possible in cases in which a second subarea 11c, 11d has a border edge, cf. the second subareas 11c, 11d. A border edge can, but need not, be straight. However, it must not have any bends (in this case, there is a corner). The associated first subarea 10c, 10d is also advantageously a linear (in the sense of straight) structure again in this case.

when a second subarea 11e has a corner, the respective first subarea 10e should advantageously comprise the corner. A corner is an area in which two border edges of the corresponding second subareas 11e are adjacent to each other while forming an angle. The angle is different from both 0° and from 180°. As a rule, it is between 45° and 135° or between 225° and 315°. This applies analogously when a second subarea 11f has an overhang, cf. the first subarea 10f. An overhang exists when the second subarea 11f has no counterpart in the underlying layer 8 (see FIG. 1). In this case, the respective first subarea 10f should advantageously comprise the overhang. In FIG. 4, the underlying layer 8 is shown as a dashed line for the second subarea 11f (and only for this).

In a step S3, the control device 4 controls the process beam generator 2 such that the process beam generator 2 generates a process beam 12. The process beam 12 can be a laser or electron beam, for example. The process beam 12 is directed at the first subareas 10 by means of a deflection device 13 (which can be seen as a component of the process beam generator 2). The first subareas 10 are heated as a result. However, the process beam generator 2 is only controlled by the control device 4 such that the grains of the powder 9 in the respective first subarea 10 are heated by means of the process beam 12, but not yet connected to one another. Furthermore, only the first subareas 10 are heated. No heating takes place outside the first subareas 10. The heating in step S3 therefore only takes place locally in the first subareas 10 of the applied layer 8.

After heating the first subareas 10, a temperature profile of the applied layer 8 is detected by means of the detection device 3. The temperature T induced by the heating in step S3 is therefore detected as a function of the location in the layer 8. The detection device 3 can, for example, use thermal imaging detectors. Alternatively, or in addition, a filter 14 can be arranged in the beam path between the layer 8 and the detection device 3. In this case, the temperature profile is spectrally filtered by means of the filter 14 prior to detection by the detection device 3, such that the process beam 12 itself is masked in the temperature profile. It is possible that the detection device 3 continuously detects the temperature profile. Alternatively, it is possible that the detection device 3 only detects the temperature profile based on a control by the control device 4. In both cases, the temperature profile is supplied to the control device 4, which receives it in a step S4. Furthermore, it is possible that the detection device 3 only detects the temperature profile in the immediate vicinity of the first subareas 10. Advantageously, however, the temperature profile is detected over the entire layer 8. Furthermore, it is possible that the detection device 3 only detects the temperature profile once after heating. Alternatively, it is possible that the detection device .3 detects the temperature profile a plurality of times after heating.

Figure 5:
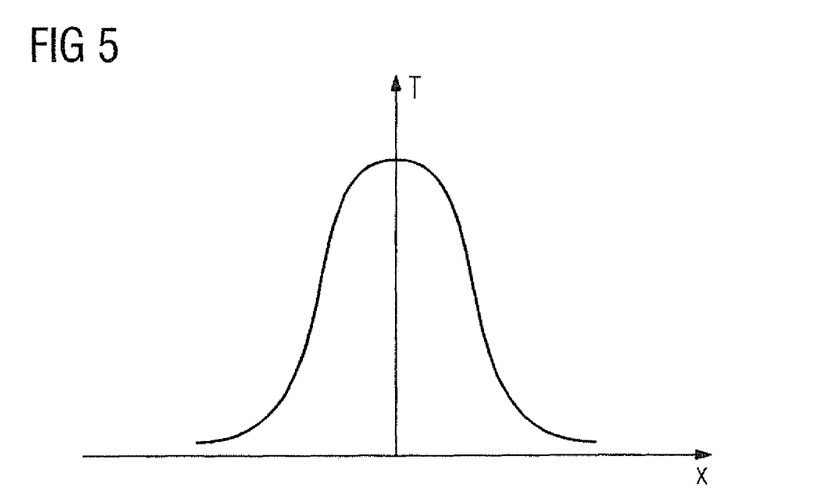
FIG. 5 shows a one-dimensional temperature profile.
Figure 6:
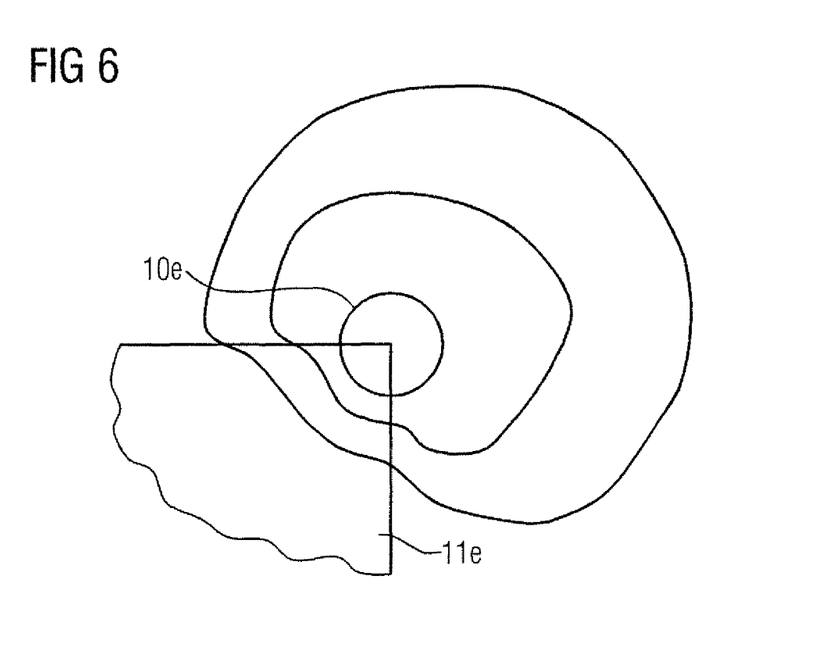
FIG. 6 shows a two-dimensional temperature profile.

In a step S5, the control device 4 then evaluates the detected temperature profile. If a respective first subarea 10—for example the first subarea 10a—is designed as a linear structure, in particular the temperature profile can be evaluated orthogonally to the linear structure. The temperature T is therefore determined and evaluated as a function of the distance x from the corresponding linear structure of the first subarea 10. This is shown in FIGS. 4 and 5, wherein the direction of the distance x is obtained from FIG. 4 for the first subarea 10a and FIG. 5 shows the temperature as a function of the distance x, In this case, an evaluation in one (1) dimension therefore takes place. The same (one-dimensional) evaluation is possible if a respective first subarea 10—in this case, for example, the first subarea 10e—is designed (more or less) as a point structure. This is also shown in FIGS. 4 and 5, wherein the direction of the distance x is obtained from FIG. 4 for the first subarea 10e and FIG. 5 shows the temperature as a function of the distance x. Alternatively, however, an evaluation in two dimensions is also possible in this case. This is shown in FIG. 6, in which purely by way of example, curves of equal temperature (isotherms) and the associated temperature values are entered. In the case of an evaluation in two dimensions, for example in the case of a circular manifestation of isotherms, an anisotropic distribution of the thermal conductivity k can be extrapolated. If the detection device 3 has detected the temperature profile a plurality of times after heating, in step S5—alternatively or in addition to the spatial evaluation of the heating—a temporal evaluation can also take place.

The evaluation of the temperature profiles for the various first subareas 10 is usually possible independently of one another. This is because, as a rule, only relatively short distances from the respective first subarea 10 are involved. An evaluation in the vicinity of the respective first subarea 10 is therefore sufficient. The heating of the various first subareas 10 is therefore not mutually influenced.

As part of the evaluation of the step S5, the control device 4 determines at least the local thermal conductivity k (W/mK unit) based on the temperature profile for the respective first subarea 10. Advantageously, the local thermal conductivity k, that is to say a respective numerical value, is determined quantitatively. In some cases, however, it may be sufficient to estimate and/or only qualitatively determine the thermal conductivity k, in other words to determine whether it is greater or smaller in certain first subareas 10 than in other first subareas 10.

In a step S6, the control device 4 determines a process variable of the process beam 12 for each of the second subareas 11. The determination takes place individually for the respective second subarea 11 as a function of the local thermal conductivity k which the control device 4 has determined previously in the step S5 for the at least overlapping first subarea 10. The process variable is a process variable which influences the heating of the respective second subarea 11.

As a process variable of the process beam 12, for example, the output of the process beam 12 can be used as such. Here "output" is taken to mean not the total output contained in the process beam 12 but the output density (in $W/m^2$) of the process beam 12 on the layer 8. Alternatively, or in addition, the feed rate with which the process beam 12 is moved over the layer 8, for example, can be used as a process variable of the process beam 12. Alternatively, or in addition, a modulation of the output of the process beam 12, for example, can be used as a process variable of the process beam 12. Thus, for example, it can make a difference whether an energy input into a certain second subarea 11 takes place uniformly, in a pulsed manner or in a plurality of intervals. Alternatively, or in addition, a focus variable of the process beam 12, for example, can be used as a process variable of the process beam 12.

Then the control device 4 controls the process beam generator 2 in a step S7 again, such that the process beam generator 2 generates a process beam 12. The process beam 12 is directed at the second subareas 11 by means of the deflection device 13. The second subareas 11 are heated as a result. However, unlike the step S3, the process beam generator 2 is controlled by the control device 4 such that the grains of the powder 9 in the respective second subarea 11 are not only heated but connected to one another by means of the process beam 12. For example, during the second heating process sintering or melting of the applied powder 9 can take place in the second subareas 11. Outside the second subareas 11, however, no heating takes place. The heating of the step S7 therefore only takes place locally in the second subareas 11 of the applied layer 8.

In a step S8, the control device 4 checks whether the production of the structure to be produced has been completed. If this is not the ease, in a step S9 the control device 4 controls an actuator 15 such that the baseplate 7 is lowered by a predetermined amount—usually in the sub-millimeter range. Thereafter the control device 4 returns to the step S1. The steps S1 to S7 are therefore performed iteratively until the production of the structure to be produced has been completed.

Figure 7:
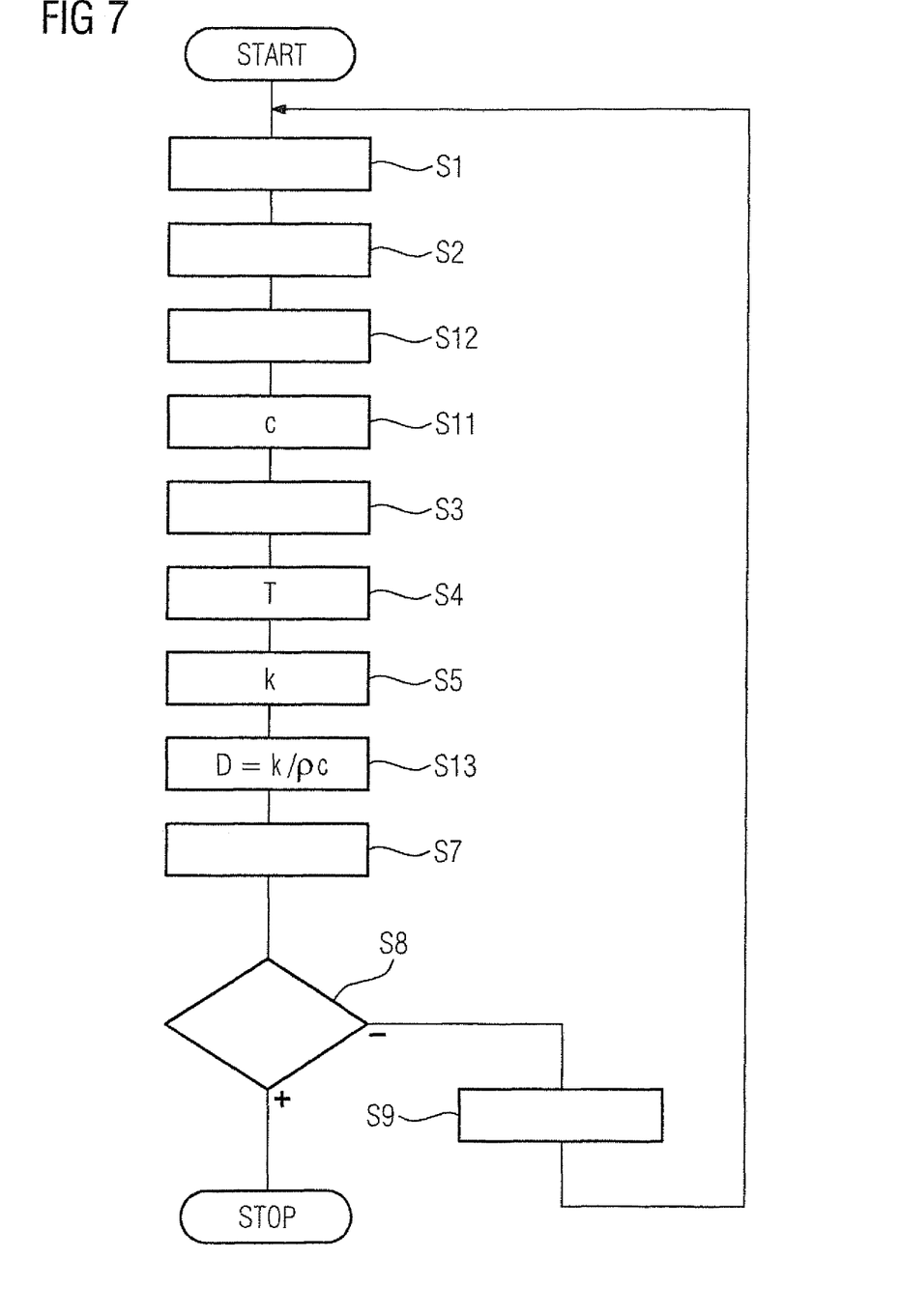
FIG. 7 is another process flow chart.

FIG. 7 shows a modification of the approach of FIG. 3. In particular, the approach of FIG. 7 also comprises the steps S1 to S5 and S7 to S9 of FIG. 3.

In addition, a step S11 exists. In the step S11, the control device 4 also determines the local thermal capacity c of the material comprising the powder 9 (J/kgK unit). If necessary, a homogeneous, extensive heating of the layer 8 can take place for this purpose, in a step S12 preceding the step S11. Analogously to the thermal conductivity k, the determination of the thermal capacity c advantageously takes place quantitatively, but in individual cases also only qualitatively. The step S6 is replaced by a step S13. The step S13 essentially corresponds to the step S6. In addition, however, in the step S13 the local thermal capacity c is also taken into account as part of the determination of the at least one process variable of the process beam 12. For example, the control device 4 can determine the local diffusivity $D=k/\rho c$ in the step S13. $\rho$ is the density ($kg/m^3$ unit) of the material comprising the powder 9.

Figure 8:
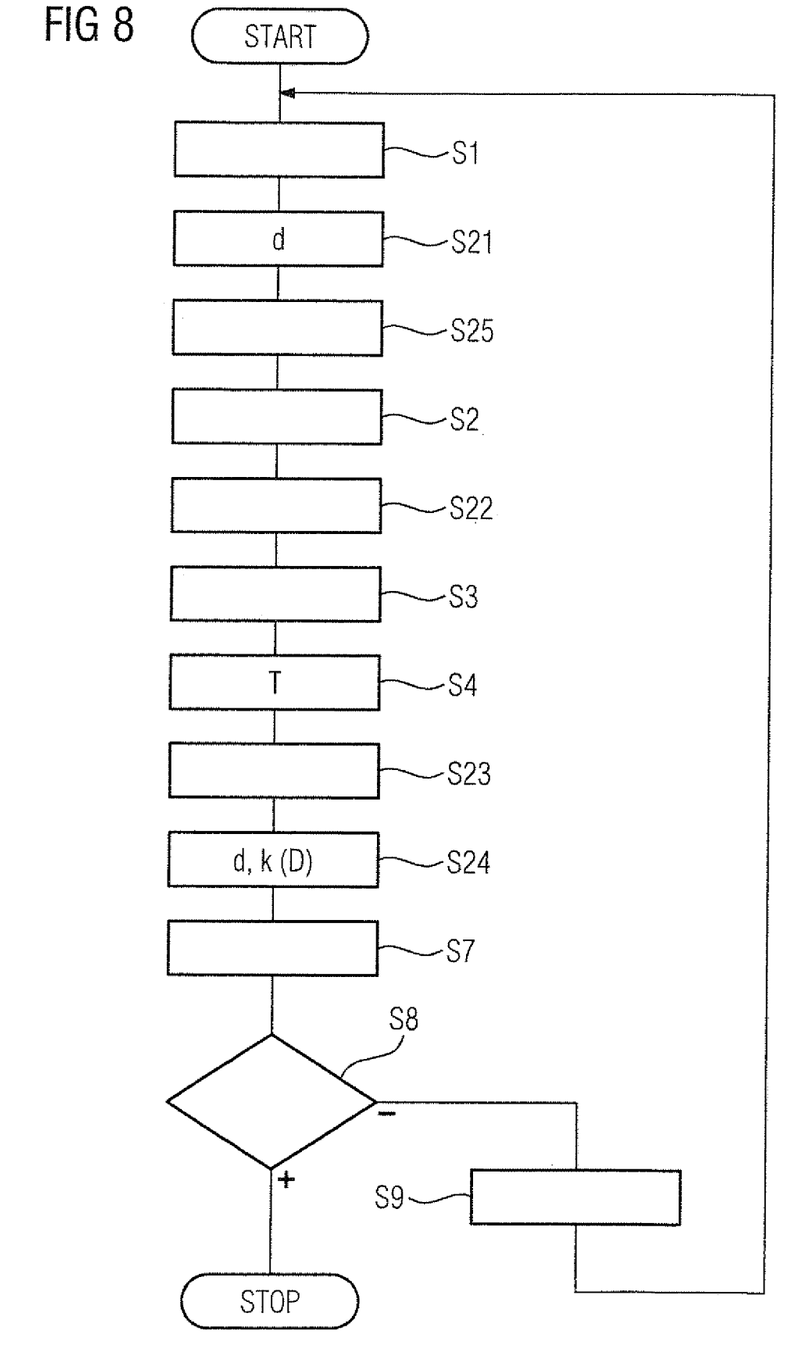
FIG. 8 is yet another process flow chart.

The approaches of FIG. 3 (and also of FIG. 7) can be modified according to FIG. 8. According to FIG. 8, in a step S21 prior to the first heating process the local thickness d of the applied layer 8 is determined by the control device 4. Furthermore, in a step S22 a process variable of the process beam 12 is determined by the control device 4. The process variable of the process beam 12 determined in the step S22 influences the heating of the first subareas 10. The implementation of the step S3 is therefore influenced by the step S22. Alternatively, or in addition, it is possible to replace the step S5 with a step S23. The step S23 essentially corresponds to the step S5. In addition, however, as part of the evaluation of the temperature profile—in other words the determination of the local thermal conductivity k or the local diffusivity D—the determined local thickness d is taken into account. Alternatively, or in addition, it is possible to replace the step S6 with a step S24. The step S24 essentially corresponds to the step S6. In addition, however, as part of the determination of the process variable of the process beam 12, the local thickness d is taken into account. The process variable of the process beam 12 is therefore not only determined as a function of the local thermal conductivity k or the local diffusivity D but also as a function of the local thickness d. Furthermore, it is possible to perform a compensation process in a step S25. The aim of the compensation process is to compensate for fluctuations in the local thickness d. The step S25 is always performed as part of the embodiment of FIG. 8, if it exists, after the step S21 and prior to the first heating process, in other words prior to the step S3.

Figure 9:
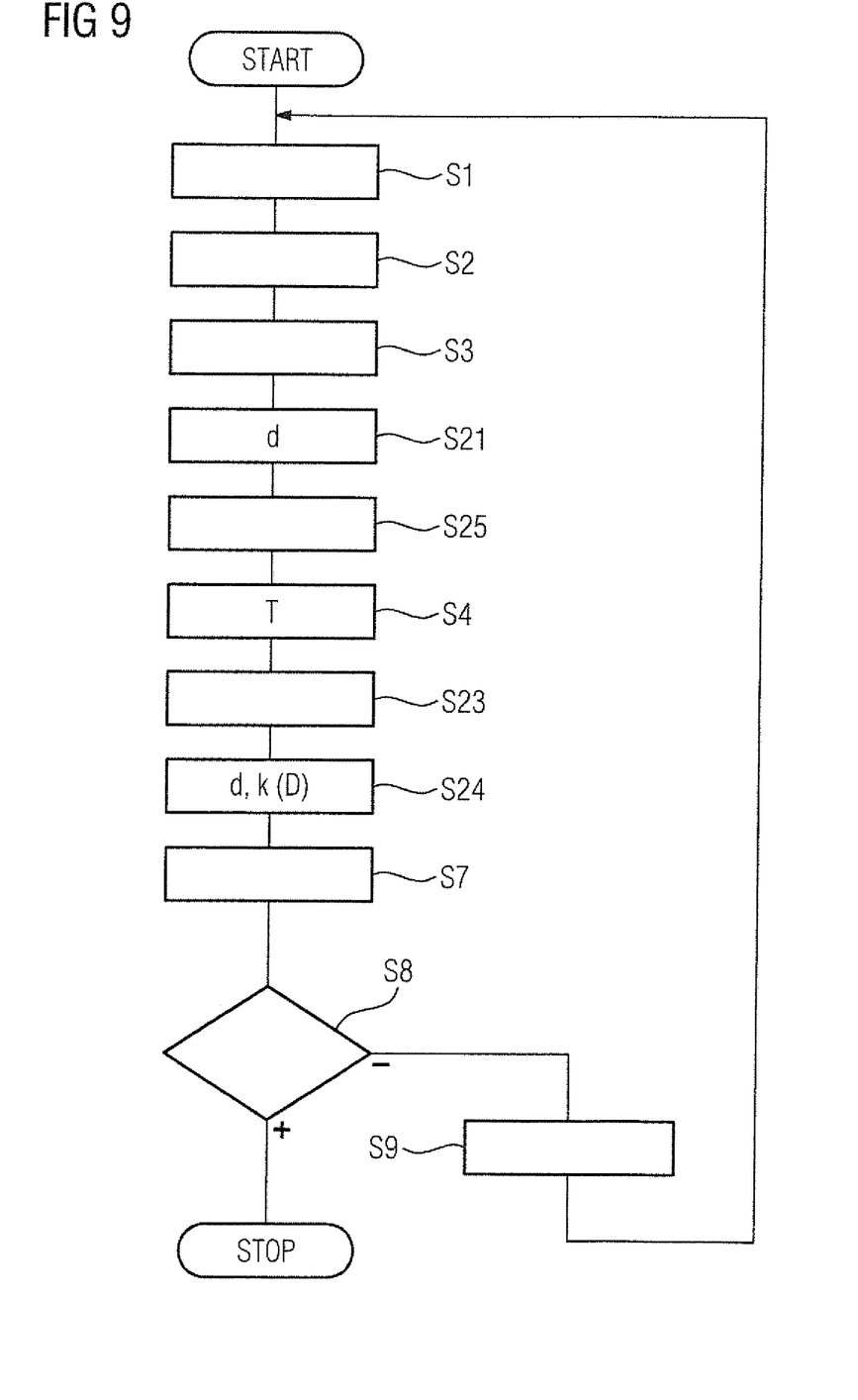
FIG. 9 is still another process flow chart.

Alternatively, for modification according to FIG. 8, a modification according to FIG. 9 is possible. FIG. 9 shows a similar approach to FIG. 8. In the approach according to FIG. 9, however, the step S21 is not performed prior to the first heating process (step S3), but after the first heating process (but prior to the second heating process). In this case, the step S22 is omitted. However, it is still possible to take into account the local thickness d as part of the step S23—in other words, as part of the evaluation of the temperature profile and/or the determination of the local thermal conductivity k or the local diffusivity D—and/or as part of the step S24—in other words as part of the determination of the process variable of the process beam 12 as a function of the local thermal conductivity k or local diffusivity D. The step S25 can also continue to exist. It is performed as part of the modification according to FIG. 9, however not prior to the first heating process, but prior to the second heating process.

In short, the present invention thus relates to the following facts:

A layer of powder 8 is applied to a substrate. First subareas 10 of the applied layer 8 are heated locally by means of a process beam 12 such that the grains of the powder 9 in the respective first subarea 10 are heated, but not yet connected to one another. A temperature profile of the applied layer 8 is detected. The temperature profile is evaluated in the vicinity of the respective first subarea 10 as a function of the distance x from the respective first subarea 10 and/or the time. As part of the evaluation, at least the local thermal conductivity k or local diffusivity D is quantitatively or qualitatively determined based on the temperature profile for the respective first subarea 10. By means of the process beam 12, second subareas 11 of the applied layer 8 which at least partially overlap the first subareas 10 are then heated locally such that the grains of the powder 9 in the respective second subarea 11 are connected with one another. At least one process variable of the process beam 12 influencing the heating of the second subareas 11 is determined as a function of the local thermal conductivity k or diffusivity D previously determined for the at least overlapping first subarea 10.

The present invention has many advantages. In particular, local fluctuations in the thermal conductivity k and/or the diffusivity D may be taken into account in a simple manner. This is particularly important if the material comprising the powder 9 is a metal. This is because unlike plastics, metals display a thermal conductivity k in the range of 100 W/mK and often even above.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating an additive manufacturing device, comprising:
   a) with an application device, applying a layer of a powder onto a substrate;
   b) in a first heating process, locally heating with a process beam first subareas of the applied layer so as to heat, but not yet interconnect with one another, grains of the powder in a respective first subarea;
   c) measuring with a detection device a temperature profile of the applied layer;
   d) evaluating the temperature profile in a vicinity of a respective first subarea as a function of a distance from the respective first subarea or as a function of time, or both;
   e) quantitatively or qualitatively determining, as part of the evaluation, at least a local thermal conductivity or a local diffusivity for the respective first subarea based on the temperature profile;
   f) in a second heating process, locally heating with the process beam second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the focal diffusivity previously determined for the respective overlapping first subarea, and
   g) iteratively performing the steps a) through f) until a complete structure has been produced on the substrate.

2. The method of claim 1, wherein the applied powder is sintered or melted during the second heating process in the second subareas.

3. The method of claim 1, wherein the process beam is a laser beam or an electron beam.

4. The method of claim 1, wherein at least one of the first subareas is embodied as a linear structure and wherein the temperature profile is evaluated in one dimension orthogonally to the linear structure.

5. The method of claim 1, wherein at least one of the first subareas is embodied as a point structure and wherein the temperature profile is evaluated in one dimension or in two dimensions orthogonally to the point structure.

6. The method of claim 1, wherein when a second subarea is embodied as an elongated structure, the respective first subarea is embodied as a linear structure parallel or orthogonal to the second subarea.

7. The method of claim 1, wherein when a second subarea has a border edge, the respective first subarea is embodied as a linear structure parallel or orthogonal to the border edge.

8. The method of claim 1, wherein when a second subarea has a corner or an overhang, the respective first subarea comprises the corner or the overhang.

9. The method of claim 1, further comprising:
   either prior to the first heating process, determining a local thickness of the applied layer, and thereafter taking the local thickness into account when determining a process variable of the process beam influencing the heating of the first subareas at step e), when determining the local thermal conductivity or the local diffusivity, or when determining the at least one process variable of the process beam influencing the heating of the second subareas at step f), or
   subsequent to the first heating process, determining a local thickness of the applied layer, and thereafter taking the local thickness into account when determining the local thermal conductivity or the local diffusivity, or taking the local thickness additionally into account when determining the at least one process variable of the process beam influencing the heating of the second subareas at step f).

10. The method of claim 9, further comprising after the local thickness has been determined, compensating for fluctuations in the local thickness prior to a subsequent heating process.

11. The method of claim 1, further comprising:
determining a local thermal capacity, and
taking the determined local thermal capacity into account when determining the at least one process variable of the process beam influencing the heating of the second subareas.

12. The method of claim 1, wherein the process beam comprises at least one of the following variables:
an output power of the process beam,
a feed rate at which the process beam is moved over the layer,
a modulation of the output power of the process beam, and
a focus dimension of the process beam.

13. The method of claim 1, further comprising spectrally filtering the temperature profile prior to detection by the detection device in order to block the process beam in the temperature profile.

14. The method of claim 1, wherein the detection device comprises thermal imaging detectors.

15. An additive manufacturing device, comprising:
an application device configured to apply a layer of a powder onto a substrate,
a process beam generator generating a process beam which locally heats a subarea of the applied layer,
a detection device measuring a temperature profile of the applied layer, and
a control device configured to cause
  a) in a first heating process, the process beam to locally heat first subareas of the applied layer so as to heat, but not yet interconnect with one another, grains of the powder in a respective first subarea;
  b) evaluate the measured temperature profile in a vicinity of a respective first subarea as a function of a distance from the respective first subarea or as a function of time, or both;
  c) quantitatively or qualitatively determine, as part of the evaluation, at least a local thermal conductivity or a local diffusivity for the respective first subarea based on the temperature profile;
  d) in a second heating process, the process beam to locally heat second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the local diffusivity previously determined for the respective overlapping first subarea, and
  e) iteratively perform the steps a) through d) until a complete structure has been produced on the substrate.

16. A computer program embodied on a non-transitory storage medium and comprising machine code, which when loaded into a memory of a control device of an additive manufacturing device and executed by the control device cause the control device to operate the additive manufacturing device by:

a) with an application device, applying a layer of a powder onto a substrate;
b) in a first heating process, locally heating with a process beam first subareas of the applied layer so as to heat, but not yet interconnect with one another, grains of the powder in a respective first subarea;
c) measuring with a detection device a temperature profile of the applied layer;
d) evaluating the temperature profile in a vicinity of a respective first subarea as a function of a distance from the respective first subarea or as a function of time, or both;
e) quantitatively or qualitatively determining, as part of the evaluation, at least a local thermal conductivity or a local diffusivity for the respective first subarea based on the temperature profile;
f) in a second heating process, locally heating with the process beam second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the local diffusivity previously determined for the respective overlapping first subarea, and
g) iteratively performing the steps a) through f) until a complete structure has been produced on the substrate.

17. A control device for an additive manufacturing device, the additive manufacturing device comprising
an application device configured to apply a layer of a powder onto a substrate,
a process beam generator generating a process beam which locally heats a subarea of the applied layer,
a detection device measuring a temperature profile of the applied layer, and
a control device configured to
  a) in a first heating process, cause the process beam to locally heat first subareas of the applied layer so as to heat, but not yet interconnect with one another, grains of the powder in a respective first subarea;
  b) evaluate the measured temperature profile in a vicinity of a respective first subarea as a function of a distance from the respective first subarea or as a function of time, or both;
  c) quantitatively or qualitatively determine, as part of the evaluation, at least a local thermal conductivity or a local diffusivity for the respective first subarea based on the temperature profile;
  d) in a second heating process, cause the process beam to locally heat second subareas of the applied layer which at least partially overlap the first subareas so as to not only heat, but to also interconnect with one another, the grains of the powder in the second subareas, wherein at least one process variable of the process beam influencing the heating of the second subareas is determined as a function of the local thermal conductivity or the local diffusivity previously determined for the respective overlapping first subarea, and
  e) iteratively perform the steps a) through d) until a complete structure has been produced on the substrate.

* * * * *